Feb. 4, 1941.    W. R. LAW    2,230,959
ORIFICE PLATE
Filed May 23, 1938

Inventor
William R. Law
By Emery, Booth, Holcombe Miller
Attorneys

Patented Feb. 4, 1941

2,230,959

UNITED STATES PATENT OFFICE 2,230,959

ORIFICE PLATE

William R. Law, Fort Worth, Tex.

Application May 23, 1938, Serial No. 209,635

2 Claims. (Cl. 138—44)

This invention relates to orifice plates for meters for measuring the volume of flow of fluids, particularly water, oil and gas flowing from drilled wells and through pipe lines.

The invention aims to prolong the useful life of orifice meter plates in pipe lines and other installations through which corrosive or sand laden fluids are being conducted, and which soon become pitted and inaccurate if made of steel or any of the usual acid resisting alloys because of corrosion and attrition from the rapid passage of the fluid and the solid particles frequently carried in suspension therein.

The invention comprises substituting for the circular or central portion of an orifice meter plate of the usual shape and dimensions, a disc composed of Bakelite or other phenolic resinoid, baked and compressed into sheets which have a smooth surface and a toughness and density suitable for drilling and machining to accurate size to suit the purpose desired. For some purposes it is advantageous to use a laminated disc composed of layers of fabric impregnated with Bakelite or other phenolic resinoid in liquid or plastic condition and compressed and subjected to heat until solidified in a hard durable thin sheet which can be drilled or otherwise machined to accurate size. The compressed disc may be surrounded by a continuous metal ring to protect it from injury during handling, and if of laminated construction, to prevent any layer from splitting or peeling away from the solid mass. The ring may be spun or pressed over the edge of the disc, or the latter may be pressed into place and formed therein, as may be found best suited to conditions of manufacture and use.

Figure 1:
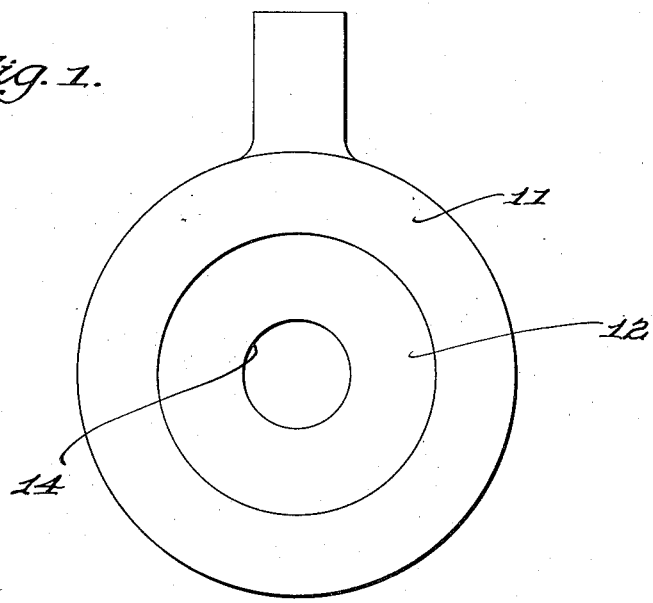
Figure 2:
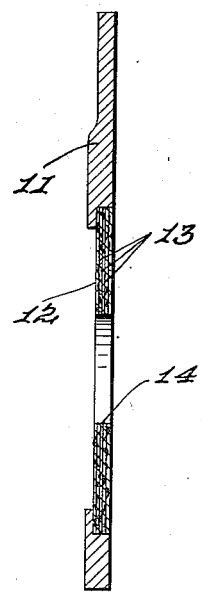

In the accompanying drawing, illustrating a preferred form of the invention, Fig. 1 is a face view and Fig. 2 an axial cross-section of an orifice plate comprising a metal ring 11 supporting a disc 12 composed of layers 13 of textile fabric impregnated with Bakelite or other liquid or plastic binder material and which has been hardened or cured by heat and pressure. A central orifice 14 of desired dimensions is accurately formed in the disc by any suitable means, such as by drilling and reaming. Plates of this built-up construction, or made entirely without metal parts, may be readily assembled in a fluid or liquid pipe line in the same manner as metallic plates have heretofore been used.

Experience in oil and gas pipe lines in northern Texas and Oklahoma with experimental orifice meter plates embodying the invention indicates that such plates may be expected to give continuous accurate service for a period of several years under conditions which cause the best metal orifice meter plates to lose their accuracy within from sixty to ninety days.

For example, 6 to 12 layers of linen or heavy cotton duck impregnated with a solution of phenolic resin in acetone and compressed between plates heated to from 250° F. to 550° F. for a period of from 2 or 3 to 50 or more hours, hardens into a sheet from ⅛ to ¼ of an inch thick having a smooth hard surface and a toughness and density suitable for drilling with an orifice of standard size for measuring the volume of flow of gas and oil, and orifice meter plates have been successfully used in pipe lines from a highly corrosive producing field without appreciable corrosion or pitting after twelve to eighteen months uninterrupted service.

The invention is not restricted to the laminated form, nor to any special kind of fabric or number of layers, nor to the use of any special phenolic resinoid, any good grades of fabric and resinous impregnating material being satisfactory that will form a hard dense machinable product when subjected to adequate heat and pressure.

I claim the following as my invention:

1. An orifice meter plate for pipe lines handling corrosive fluids or fluids carrying solid particles in suspension therein, composed of a plurality of layers of fabric impregnated with a phenolic condensation product and formed into a thin, hard, corrosion resisting sheet with heat and pressure, provided with a smooth walled orifice of circular shape.

2. An orifice meter plate for pipe lines handling corrosive fluids or fluids carrying solid particles in suspension therein, comprising a plurality of layers of fabric impregnated with a resinoid dissolved in a volatile solvent and formed into a thin, hard, corrosion resisting sheet with heat and pressure, provided with a smooth walled orifice of circular shape and an encircling metal rim.

WILLIAM R. LAW.